US011941928B2

(12) United States Patent
Shaikh et al.

(10) Patent No.: US 11,941,928 B2
(45) Date of Patent: Mar. 26, 2024

(54) MOBILE DEVICE NOTIFICATION VIA ACCESS CONTROL DEVICE

(71) Applicant: Carrier Corporation, Palm Beach Gardens, FL (US)

(72) Inventors: Nadeem Shaikh, Hyderabad (IN); Ramesh Lingala, Hyderabad (IN); Avineet Nanda, Hyderabad (IN); Adam Kuenzi, Silverton, OR (US)

( * ) Notice: Subject to any disclaimer, the term of this patent is extended or adjusted under 35 U.S.C. 154(b) by 0 days.

(21) Appl. No.: 17/449,958

(22) Filed: Oct. 5, 2021

(65) Prior Publication Data

US 2022/0114848 A1 Apr. 14, 2022

Related U.S. Application Data

(60) Provisional application No. 63/198,347, filed on Oct. 13, 2020.

(51) Int. Cl.
*G07C 9/00* (2020.01)
*G07C 9/20* (2020.01)

(52) U.S. Cl.
CPC ........... *G07C 9/00309* (2013.01); *G07C 9/20* (2020.01); *G07C 2009/00769* (2013.01)

(58) Field of Classification Search
CPC .................. G07C 9/00309; G07C 9/20; G07C 2009/00769
See application file for complete search history.

(56) References Cited

U.S. PATENT DOCUMENTS 9,070,276 B2 6/2015 Le
9,512,643 B1 * 12/2016 Keefe ..................... E05B 47/06
10,446,012 B2 10/2019 Mukundala
2010/0271202 A1 10/2010 Lin
2014/0073262 A1 * 3/2014 Gutierrez ............... G08B 13/22 455/67.11
2017/0203721 A1 7/2017 Hamada et al.
2019/0197870 A1 * 6/2019 Mukundala ............ G08B 21/24
2019/0272729 A1 * 9/2019 Staninger ............... G08B 21/22
2019/0295355 A1 * 9/2019 Santhosh ................ G07F 17/12

FOREIGN PATENT DOCUMENTS

DE 102009038580 A1 2/2011
EP 0931896 A2 7/1999
EP 3503057 A1 6/2019

OTHER PUBLICATIONS

EP Application No. 21202509.2, Extended Search Report, dated Mar. 11, 2022, 8 pages.

* cited by examiner

*Primary Examiner* — Nabil H Syed

(57) ABSTRACT

An access control device and a method for operating an access control device are provided. The access control device includes a detection sensor, a communication module, and a processor. The detection sensor is configured to detect a status event (e.g., a rotation of a handle, or an insertion or closure of a keybox). The communication module is in wireless communication with a mobile device. The communication module is configured to receive an advertising signal from the mobile device. The processor is in communication with at least one of the detection sensor and the communication module. The processor is configured to determine whether a distance between the mobile device and the access control device is greater than a threshold when the detection sensor detects the status event. The processor is configured to trigger a notification when the distance is greater than the threshold.

19 Claims, 2 Drawing Sheets

MOBILE DEVICE NOTIFICATION VIA ACCESS CONTROL DEVICE

CROSS REFERENCE TO A RELATED APPLICATION

The application claims the benefit of U.S. Provisional Application No. 63/198,347 filed Oct. 13, 2020, the contents of which are hereby incorporated in their entirety.

BACKGROUND

Access control devices (e.g., lockboxes and hotel locks) can be used to control various types of protected environments. Lockboxes can be used to control the access to one or more items inside the lockbox (e.g., a key for a door to a home). Hotel locks can be used to limit access to a hotel room. Regardless of the type of access control device, to access the protected environment, authorized access credentials must be presented (e.g., to the access control device).

Conventionally, access credentials have been presented to the access control devices using an RFID card, a FOB, a card with a magnetic stripe, and/or a mobile device. For example, in a hotel setting, a person may use their personal mobile device (e.g., a smartphone) to present access credentials to the lock on the door to their hotel room, which, if authenticated, allows the person to enter the hotel room. Likewise, in the real estate industry, a realtor may use a mobile device (e.g., their personal or work smartphone) to present access credentials to the lockbox, which, if authenticated, allows the realtor to access the key to a door to the home they are showing. Regardless of the industry, problems arise when the user of the mobile device leaves their phone behind when exiting the protected environment.

For example, in the hotel industry, the guest may only have one means of presenting access credentials to the door lock (e.g., their mobile device), which if left behind when exiting the hotel room may cause the guest to be locked out of their room, as hotel doors are often configured to lock automatically when closed. Likewise, in the real estate industry, the realtor may only have one means of presenting access credentials to the lockbox (e.g., their mobile device), which if left behind in the home being shown when returning the key to the lockbox may cause the realtor to be unable reenter the home to access their mobile device and/or other homes that they intended on showing. In both industries the user of the mobile device may be unable to access their mobile device and/or the protected environment without the help of someone else (e.g., either requesting a staff member of the hotel to unlock their room, or having a homeowner or another realtor to unlock the house). As can be assumed, this can be very cumbersome to the operation of the hotel and/or the real estate company.

Accordingly, there remains a need for an access control device that is capable of notifying a user of a mobile device when the mobile device is being left behind in the protected environment.

BRIEF DESCRIPTION

According to one embodiment an access control device including a detection sensor, a communication module, and a processor is provided. The detection sensor is configured to detect a status event. The communication module is in wireless communication with a mobile device. The communication module is configured to wirelessly receive an advertising signal from the mobile device. The processor is in communication with at least one of the detection sensor and the communication module. The processor is configured to determine whether a distance between the mobile device and the access control device is greater than a threshold when the detection sensor detects the status event. The processor is configured to trigger a notification when the distance is greater than the threshold.

In accordance with additional or alternative embodiments, the status event includes at least one of: a rotation of a handle, and an insertion or closure of a keybox.

In accordance with additional or alternative embodiments, the access control device further includes a lock actuator operatively connected to the processor, the processor configured to maintain the lock actuator in an unlocked position when the distance is greater than the threshold.

In accordance with additional or alternative embodiments, the processor determines the distance between the mobile device and the access control device based on a received signal strength of the advertising signal.

In accordance with additional or alternative embodiments, the mobile device includes a MEMS sensor, the mobile device configured to transmit the advertising signal only when the MEMS sensor detects movement.

In accordance with additional or alternative embodiments, the MEMS sensor includes at least one of: an accelerometer, an inclinometer, and a gyroscope.

In accordance with additional or alternative embodiments, the processor determines the distance between the mobile device and the access control device to be greater than the threshold when the advertising signal is not received within a time period.

In accordance with additional or alternative embodiments, the time period is less than two (2) seconds of the detection of the status event by the detection sensor.

In accordance with additional or alternative embodiments, the threshold is less than five (5) feet.

In accordance with additional or alternative embodiments, the notification includes at least one of: an audible signal, a vibratory signal, and a visual signal.

In accordance with additional or alternative embodiments, the notification is performed by at least one of: the access control device, a room management system, the mobile device, and a wearable.

In accordance with additional or alternative embodiments, the communication module is configured to receive an access credential from at least one of: an RFID card, a FOB, a card with a magnetic stripe, and the mobile device.

In accordance with additional or alternative embodiments, the processor is configured to determine the distance between the mobile device and the access control device only if the communication module receives the access credential from the mobile device.

In accordance with additional or alternative embodiments, at least one of the access credentials and the advertising signal are transmitted to the communication module using a short-range communication.

According to another aspect of the disclosure, a method of operating an access control device including a detection sensor, a communication module, and a processor is provided. The method includes a step for detecting a status event with the detection sensor. The method includes a step for determining, by the processor, whether a distance between the access control device and a mobile device is greater than a threshold. The method includes a step for triggering a notification with the processor when the distance is greater than the threshold.

In accordance with additional or alternative embodiments, the status event includes at least one of: a rotation of a handle, and an insertion or closure of a keybox.

In accordance with additional or alternative embodiments, the method further includes a step for maintaining a lock in an unlocked position when the distance is greater than the threshold.

In accordance with additional or alternative embodiments, the processor determines the distance between the mobile device and the access control device based on a received signal strength of an advertising signal from the mobile device.

In accordance with additional or alternative embodiments, the mobile device is configured to transmit the advertising signal only when a MEMS sensor detects movement of the mobile device.

In accordance with additional or alternative embodiments, the processor determines the distance between the mobile device and the access control device to be greater than the threshold when an advertising signal is not received from the mobile device within a time period.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

Figure 1:
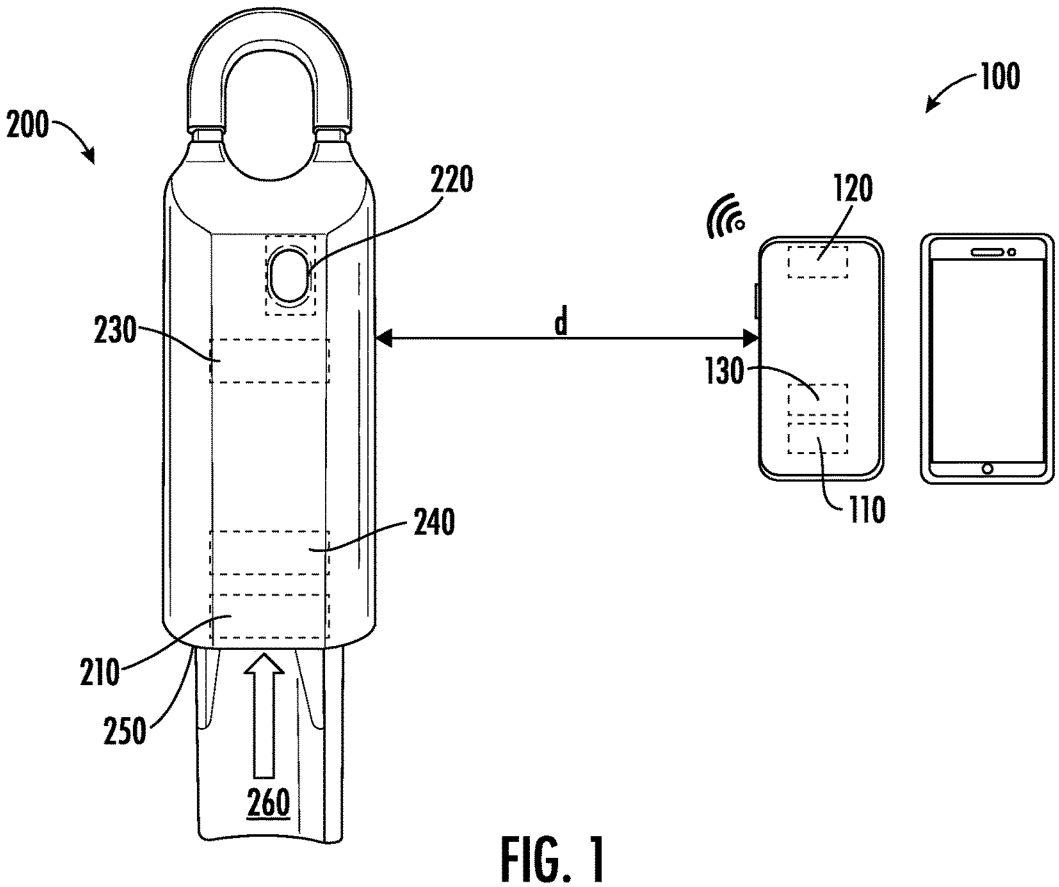
FIG. 1 is a schematic illustration of a first embodiment of an access control device with a detection sensor, a communication module, and a processor in accordance with one aspect of the disclosure.

Access control devices (e.g., lockboxes and door locks, such as those used in the real estate and hotel industries) may grant or deny access to a particular environment based on whether or not authorized credentials are received. The access credentials are often transmitted with a separate item (e.g., an RFID card, a FOB, a card with a magnetic stripe, and/or a mobile device) directly to the access control device. Regardless of what type of item is used to present the access credentials, once presented, the access credentials may be compared to the stored, authorized access credentials to see whether there is a permission linked to the requester's access credential. If there is a permission linked to the requester's access credential then the access control device may grant access to the protected environment. Conversely, if there is no permission linked to the requestor's access credential then the access control device may deny access to the protected environment.

It should be appreciated that although multiple different items may be capable of presenting access credentials, often times the person trying to obtain access only has one means of presenting the access credentials. For example, a hotel guest may opt to skip the front desk and use their mobile device to complete the check-in process (e.g., in an application stored on the mobile device), which, upon check-in, may enable the hotel guest to use their mobile device to present access credentials to the access control devices within the hotel. Likewise, a realtor may only have their access credentials on their work phone (e.g., accessible by using an application stored on their work assigned mobile device). It should be appreciated that the application may enable the user (e.g., the real estate agent or hotel guest) to communicate with a central authority (e.g., to receive access credentials for a given access control device). This central authority may be viewed as any authoritative body (e.g., front desk for a hotel, or a governing body for a multiple listing service) capable of controlling access to a given access control device. For example, the central authority may utilize one or more administrative websites, software applications, and/or other well-known access control technologies to facilitate their controlling of access to one or more access control devices. In both of these instances (both when used in the hotel setting and when used in the real estate setting), the ability to enter the protected environment may be directly tied to the user having access to their mobile device, as the mobile device may be the only item that the user has that contains their access credentials. As such, it may be critical that the user does not inadvertently lock their mobile device within the protected environment, as they may not be able to open the protected environment without their mobile device. To ensure that the mobile device does not get left behind and locked within the protected environment, an access control device that is capable of notifying a user of a mobile device when the mobile device is being left behind in the protected environment is provided.

Figure 2:
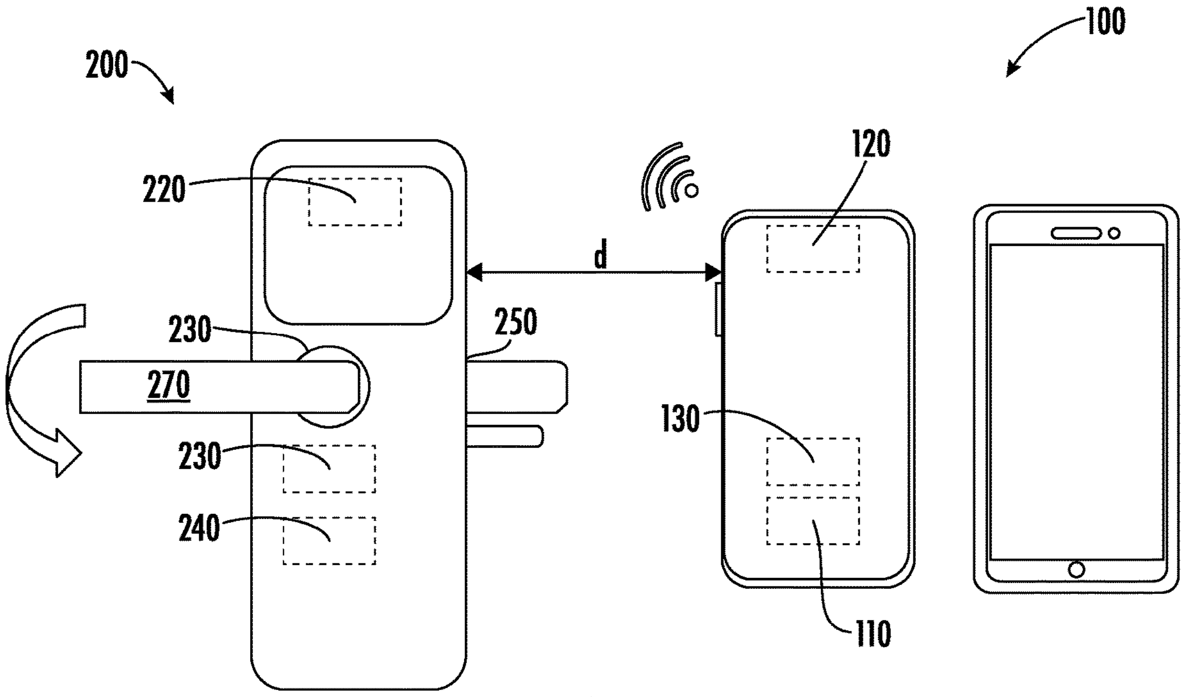
FIG. 2 is a schematic illustration of a second embodiment of an access control device with a detection sensor, a communication module, and a processor in accordance with one aspect of the disclosure.

With reference now to the Figures, various schematic illustrations of an access control device 200 are shown in FIGS. 1 and 2. FIG. 1 illustrates a first embodiment of the access control device 200 configured as a lockbox (e.g., which may be useful in the real estate industry). FIG. 2 illustrates a second embodiment of the access control device 200 configured as a door lock (e.g., which may be useful in the hotel industry). Regardless of the embodiment, the access control device 200 includes a detection sensor 210, a communication module 220, and a processor 230. The detection sensor 210 may be configured to detect a status event. The communication module 220 may be in wireless communication (e.g., using at least one of Bluetooth, Bluetooth Low Energy (BTLE), Zigbee, infrared, and Wi-Fi) with a mobile device 100 (e.g., to receive access credentials, etc.). For example, the communication module 220 may be configured to wireless receive an advertising signal from the mobile device 100. The processor 230 may be in communication (e.g., using one or more wired or wireless connections) with at least one of the detection sensor 210 and the communication module 220. For example, the detection sensor 210 may notify the processor 230 when a status event is detected, and the communication module 220 may notify the processor 230 when an advertising signal is received. The processor 230 may be configured to determine (e.g., using the received signal strength of the advertising signal, etc.) whether a distance (d) between the mobile device 100 and the access control device 200 is greater than a threshold when the detection sensor 210 detects the status event. The processor 230 may be configured to trigger a notification when the distance (d) is greater than the threshold. It is envisioned that this notification may alert a user of the mobile device 100 (or whoever is using the access control device 200 at the time) when the mobile device 100 is being left behind in the protected environment. For example, when configured as a door lock, the access control device 200 may alert someone associated with the user of the mobile device 100 such as a spouse, child, etc. as they exit the protected environment (e.g., the hotel room) if the mobile device 100 is being left behind (e.g., with the user) in the protected environment when they exit. As described below, the notification may be turned off (e.g., either in the application on the mobile device 100 and/or via a mechanism on the access control device 200). Although described herein to be especially useful in the real estate and hotel industries, it should be appreciated that the access control device 200 may be useful in any setting where a mobile device 100 may be used to present access credentials (e.g., residential door locks, senior living facilities, conference rooms, etc.).

The advertising signal(s) transmitted by the mobile device 100 and/or the access control device 200, as described herein, may be viewed as one or more beacons (e.g., usable to establish a connection between devices). The advertising signal(s) may be transmitted using a short-range communication such as Bluetooth, Bluetooth Low Energy (BTLE), Zigbee, infrared, and Wi-Fi in certain instances. The advertising signal(s) and/or the access credentials (as described below) may contain information (e.g., such as a unique device identifier, or be accompanied by an additional signal containing such information) that indicates the source of the transmission (e.g., what particular device transmitted the advertising signal and/or the access credentials). For example, when the mobile device 100 transmits the access credentials, the mobile device 100 may share a unique device identifier with the access control device 200. It is envisioned that the unique device identifier may be any unique combination of characters capable being used to identify a device. For example, the unique device identifier may be a Bluetooth address, a UUID, or a serial number or reference ID (e.g., commonly referred to as a "Keyholders ID" and/or a "Guest ID") in certain instances. The unique device identifier, regardless of the specific type, may be stored in the memory of the access control device 200. Later, when a status event is detected, the access control device 200 may look for an advertising signal (e.g., containing information such as a unique device identifier) from the same mobile device 100. For example, the access control device 200 may compare the newly received unique device identifier with the stored unique device identifier to see if the advertising signal is being transmitted from the same mobile device 100 that transmitted the access credentials. It is envisioned that that the access control device 200 may ignore advertising signals that are not transmitted from the same mobile device 100 that transmitted the access credentials. Use of unique device identifiers in this manner may help avoid any unnecessary confusion by the mobile device 100 and/or the access control device 200 (e.g., which, in the hotel and/or real estate industries, may be positioned by other access control devices 200 and/or other users with other mobile devices 100).

The status event described herein may include at least one of a rotation of a handle 270 (shown in FIG. 2) and an insertion or closure of a keybox 260 (shown in FIG. 1) in certain instances. The type of status event may be dependent on the configuration of the access control device 200 and/or the setting in which the access control device 200 is being used. For example, if the access control device 200 is being used to control the locking and unlocking of a door to a room (e.g., in a hotel setting), then the status event may be the rotation of a handle 270 (e.g., located on the interior side of a door to the room). It is envisioned that by detecting the rotation of a handle 270 on the interior side of the room, the access control device 200 may be able to acknowledge when a user of a mobile device 100 is leaving the room. If the access control device 200 is being used to control the locking and unlocking of a compartment such as a keybox 260 (e.g., in a real estate setting), then the status event may be the insertion (in the access control device 200) or closure (of a lid (not shown)) of the keybox 260. For example, when configured as lockbox, the key within the keybox 260 may be accessible either by (i) opening a lid (not shown) to the keybox 260, or (ii) removing the keybox 260 from the access control device 200. It is envisioned that by detecting the insertion or closure of the keybox 260, the access control device 200 may be able to acknowledge when a user of a mobile device 100 is attempting to return the key to the access control device 200. It should be appreciated that the access control device 200, when configured as a lockbox, may be capable of detecting (e.g., using a weight sensor, etc.) whether the key is within the keybox 260 when the keybox 260 is being inserted or closed. In certain instances, the access control device 200 may be configured to not alert if the key is not within the keybox 260 when the keybox 260 is being inserted or closed.

In both of the above-described use cases it may be advantageous to trigger a notification when a status event is detected and the distance (d) is greater than the threshold (e.g., to ensure that the user of the mobile device 100 does not lose access to the protected environment and/or their mobile device 100). This threshold may be any distance capable of indicating whether or not the mobile device 100 is with the user (e.g., stowed away in a pocket, bag, etc.). For example, the if the distance (d) between the mobile device 100 and the access control device 200 is within a few feet (e.g., less than five (5) feet) then it may be assumed that the mobile device 100 is with the user. Although the distance (d) between the access control device 200 and the mobile device 100 may be determined using any suitable technology, in certain instances, the distance (d) may be determined using the received signal strength of the advertising signal.

The determination of the distance (d) may be completed in the processor 230 of the access control device 200 (e.g., instead of in the mobile device). To complete the determination, the processor 230 may include, but is not limited to, a single-processor or multi-processor system of any of a wide array of possible architectures, including field programmable gate array (FPGA), a central processing unit (CPU), application specific integrated circuits (ASIC), digital signal processor (DSP) or graphics processing unit (GPU) hardware arranged homogenously or heterogeneously. For example, the mobile device 100 may be configured to send advertising signals (e.g., from the communication module 120 of the mobile device 100) using a short-range communication to the access control device 200 (e.g., to the communication module 220 of the access control device 200) so as to remain in connection with the access control device 200. It should be appreciated that the short-range communication used to transmit the advertising signal may include at least one of Bluetooth, Bluetooth Low Energy (BTLE), Zigbee, infrared, and Wi-Fi.

It is envisioned that the processor 230 of the access control device 200 may be configured to determine the distance (d) between the mobile device 100 and the access control device 200 only if the communication module 220 receives the access credentials from the mobile device 100. For example, the communication module 220 may be able to receive access credentials from multiple different sources (e.g., an RFID card, a FOB, a card with a magnetic stripe, and the mobile device 100). It is envisioned that the access credentials, when transmitted to the communication module 220, may include information (e.g., either unique device identifier, or accompanied by an additional signal containing such information) that indicates the source (e.g., what type of device is being used to transmit the access credentials) of the access credentials. For example, if the access credentials are transmitted to the access control device 200 using a card with a magnetic stripe then the access control device 200 may not receive the advertising signal from the mobile device 100 or notify the user if the mobile device 100 is being left behind in the protected environment. It is envisioned that the mobile device 100 and the access control device 200 may include programming to enable this functionality (e.g., stored in the respective memory 130, 240 of the mobile device 100 and/or access control device 200). The memory 130, 240 of the mobile device 100 and/or the access control device 200 may include, but is not limited to, any of the following: a hard disk, a random access memory (RAM), a read-only memory (ROM), an erasable programmable read-only memory (EPROM or Flash Memory), a static random access memory (SRAM), a portable compact disc read-only memory (CD-ROM), a digital versatile disk (DVD), a memory stick, and any suitable combination of the foregoing.

For example, the mobile device 100 may be a mobile phone, or mobile tablet such as those running the Android™ operating system of Google Inc., of Mountain View, Calif., or the iOS™ operating system of Apple Inc., of Cupertino, Calif., or the BlackBerry™ operating system of BlackBerry Limited, of Waterloo, Ontario. The mobile device 100 may be programmed with an application (e.g., an app) stored in the memory 130 of the mobile device 100 that enables the mobile device 100 to transmit access credentials and/or advertising signals to the access control device 200 (e.g., using a short-range communication). This programming may cause the mobile device 100 to transmit advertising signals (e.g., either continuously or periodically) to the access control device 200 only after transmitting access credentials to the access control device 200. In certain instances, the mobile device 100 may be configured to utilize a battery conservation technique. For example, the mobile device 100 may be configured to only transmit advertising signals when moving (e.g., so as to conserve battery power on the mobile device 100). It should be appreciated that in some instances the access control device 200 may be configured to advertise and the mobile device 100 may be configured to listen for the advertisements from the access control device 200 (e.g., the mobile device 100 may not transmit an advertising signal if the access control device 200 is not advertising), which may allow the mobile device 100 to conserve battery power.

For example, when configured to only transmit advertising signals when moving, the mobile device 100 may not transmit advertising signals when in a stationary position (e.g., for a certain period of time, such as 30 seconds, etc.). Movement of the mobile device 100 may be detected by a MEMS sensor 110. Although the MEMS sensor 110 may be any type of sensor capable of detecting the movement of the mobile device 100, in certain instances, the MEMS sensor includes at least one of an accelerometer, an inclinometer, and a gyroscope. When configured to only transmit advertising signals when moving, the access control device 200 (e.g., the processor 230 of the access control device 200) may determine that the distance (d) between the mobile device 100 and the access control device 200 is greater than the threshold when the advertising signal is not received within a period of time (e.g., within two (2) seconds) of the detection of the status event by the detection sensor 210.

In some instances, the mobile device 100 may advertise based on being within a geofence (e.g., which may be defined within a certain perimeter of the access control device 200). For example, the mobile device 100 may only transmit an advertising signal when positioned (and/or moving) within the geofence. Accordingly, the mobile device 100 may be configured to stop transmitting the advertising signal when leaving the geofence. For example, in a real estate setting, the mobile device 100 may be configured to stop advertising when leaving the property (e.g., where the access control device 200 may be located). This geofence-based advertising, as with the movement dependent advertising (e.g., when configured to only advertise while moving) and the reply dependent advertising (e.g., when configured to reply to advertisements from the access control device 200), may help conserve battery power on the mobile device 100. It is envisioned that one or more of these battery saving techniques may be combined together in certain instances. Additionally, it should be appreciated, that although only these battery control techniques are described any battery control technique may be utilized.

Regardless of whether the advertising signal is sent continuously after transmitting the access credentials or only during the movement of the mobile device 100, the access control device 200 may be configured to trigger a notification when the distance between the mobile device 100 and the access control device 200 is determined to be greater than the threshold. It is envisioned that the notification may include at least one of an audible signal, a vibratory signal, and a visual signal performed by at least one of the access control device 200, a room management system (not shown), the mobile device 100, and a wearable (not shown). For example, in the hotel industry, if a person leaves their mobile device 100 on the hotel room bed as they walk out of the door (e.g., rotating the handle 270 on the interior side of the door) then the access control device 200 may produce a visual signal (e.g., such as a flashing light) or an audible signal (e.g., such as a beep) as they walk out of the door. In another example, in the real estate industry, if a person leaves their mobile device 100 in the house they are showing as they return the key to the access control device 200 (e.g., inserting or closing the keybox 260) then a wearable (e.g., such as a smart watch that is wirelessly connected to the mobile device 100) being worn by the user may produce a visual signal (e.g., such as a flashing light), an audible signal (e.g., such as a beep), or a vibratory signal (e.g., such as a quick vibration) as they push in the keybox 260. It is envisioned that the notification may inform a user of a mobile device 100 that their phone is being left behind in the protected environment.

To ensure that the user of the mobile device 100 does not lose access to the protected environment and/or their mobile device 100, the access control device 200 may be configured to remain unlocked (e.g., for at least a certain period of time, such as 30 seconds) when a status event is detected and the distance (d) is greater than the threshold. For example, the lock actuator 250 of the access control device 200 may be operatively connected (e.g., through one or more wired or wireless connections) with the processor 230 to ensure that the lock actuator 250 remains in an unlocked position (e.g., at least for a certain period of time) if the distance (d) is greater than the threshold when the status event is detected. It is envisioned that in certain instances, the access control device 200 may include the capability of acknowledging and/or shutting off the notification and/or the remaining unlocked functionality. For example, the access control device 200 may include a mechanism (e.g., such as a privacy knob) that may include a sensor (not shown) that when activated (e.g., turned, pushed, etc.) turns off the notification and/or the remaining unlocked functionality. Likewise, the mobile device 100 (e.g., in the mobile application) may include a mechanism (e.g., such as a selectable radio button) that when activated (e.g., selected, etc.) turns off the notification and/or the remaining unlocked functionality.

Although described above to be useful in a hotel setting and/or a real estate setting, it should be appreciated that the access control device 200 described herein may be useful in a variety of different settings. For example, the access control device 200 may be useful in any type of setting where a mobile device 100 may be used to present access credentials to an access control device 200 (e.g., for residential door locks, senior living facilities, conference rooms, etc.). It is envisioned that the access control device 200 described herein may help ensure that a person does not lose access to their mobile device 100 and/or the protected environment. For example, instead of relying on a user to remember to bring their mobile device 100 with them when leaving the protected environment, the access control device 200 described herein provides a notification method to actively alert the user that their mobile device 100 is being left behind in the protected environment.

Figure 3:
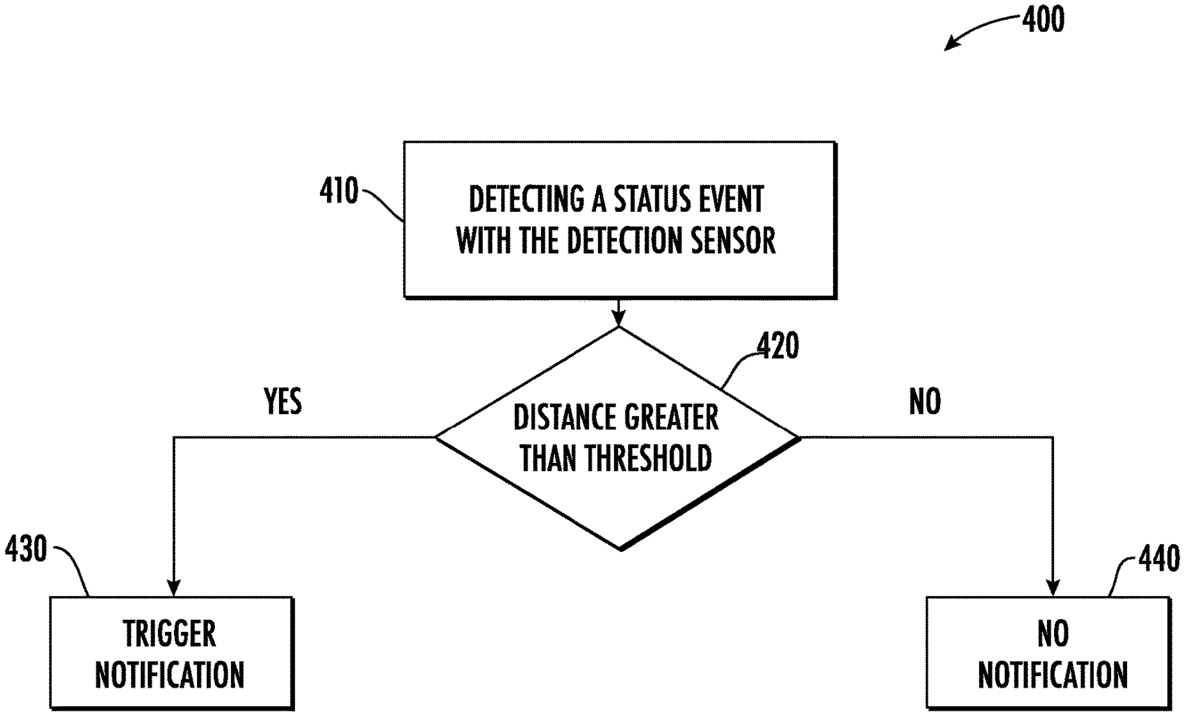
FIG. 3 is a flow diagram illustrating a method of operating an access control device in accordance with one aspect of the disclosure.

An exemplary method 400 of operating an access control device 200 is illustrated in FIG. 3. The method 400 may be performed, for example, using any of the exemplary access control devices 200 shown in FIGS. 1-2, which include a detection sensor 210, a communication module 220, and a processor 230. The method 400 includes step 410 for detecting a status event (e.g., such as a rotation of a handle 270 or the insertion or closure of a keybox 260) with the detection sensor 210. The method 400 includes step 420 for determining, in the processor 230, whether a distance (d) between the access control device 200 and a mobile device 100 is greater than a threshold. As described above, the processor 230 may determine the distance (d) between the mobile device 100 and the access control device 200 based on a received signal strength of an advertising signal from the mobile device 100. The method 400 includes step 430 for triggering a notification (e.g., such as an audible signal, a vibratory signal, and a visual signal) with the processor 230 when the distance (d) is greater than the threshold. As shown (e.g., by step 440), no notification may be triggered if the distance (d) is not greater than the threshold. As described above, the mobile device 100 may be configured to transmit the advertising signal only when a MEMS sensor 110 detects movement of the mobile device 100. In these instances, the processor 230 may determine the distance between the mobile device 100 and the access control device 200 to be greater than the threshold when an advertising signal is not received from the mobile device within a certain time period (e.g., such as matter of a few seconds). As described above, it is envisioned that the processor 230 of the access control device 200 may be configured to determine the distance (d) between the mobile device 100 and the access control device 200 only if the communication module 220 receives the access credentials from the mobile device 100. For example, if the access credentials are transmitted to the access control device 200 using something other than the mobile device 100 (e.g., such as a card with a magnetic stripe) then the access control device 200 may not receive the advertising signal from the mobile device 100 or notify the user if the mobile device 100 is being left behind in the protected environment.

The use of the terms "a" and "and" and "the" and similar referents, in the context of describing the invention, are to be construed to cover both the singular and the plural, unless otherwise indicated herein or cleared contradicted by context. The use of any and all example, or exemplary language (e.g., "such as", "e.g.", "for example", etc.) provided herein is intended merely to better illuminate the invention and does not pose a limitation on the scope of the invention unless otherwise claimed. No language in the specification should be construed as indicating any non-claimed elements as essential to the practice of the invention.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An access control device comprising:

a detection sensor configured to detect a status event;

a communication module in wireless communication with a mobile device, the communication module configured to wirelessly receive an advertising signal from the mobile device;

a processor in communication with at least one of the detection sensor and the communication module, the processor configured to responsive to detection of a status event, determine whether a distance between the mobile device and the access control device is greater than a threshold, wherein the processor is configured to responsive to determining that the distance is greater than the threshold, trigger a notification; and a lock actuator operatively connected to the processor, the processor configured to maintain the lock actuator in an unlocked position responsive to the distance being greater than the threshold.

2. The access control device of claim 1, wherein the status event comprises at least one of: a rotation of a handle, and an insertion or closure of a keybox.

3. The access control device of claim 1, wherein the processor determines the distance between the mobile device and the access control device based on a received signal strength of the advertising signal.

4. The access control device of claim 1, wherein the mobile device comprises a MEMS sensor, the mobile device configured to transmit the advertising signal only when the MEMS sensor detects movement.

5. The access control device of claim 4, wherein the MEMS sensor comprises at least one of: an accelerometer, an inclinometer, and a gyroscope.

6. The access control device of claim 1, wherein the processor determines the distance between the mobile device and the access control device to be greater than the threshold when the advertising signal is not received within a time period.

7. The access control device of claim 6, wherein the time period is less than two (2) seconds of the detection of the status event by the detection sensor.

8. The access control device of claim 1, wherein the threshold is less than five (5) feet.

9. The access control device of claim 1, wherein the notification comprises at least one of: an audible signal, a vibratory signal, and a visual signal.

10. The access control device of claim 9, wherein the notification is performed by at least one of: the access control device, a room management system, the mobile device, and a wearable.

11. The access control device of claim 1, wherein the communication module is configured to receive an access credential from at least one of: an RFID card, a FOB, a card with a magnetic stripe, and the mobile device.

12. The access control device of claim 11, wherein the processor is configured to determine the distance between the mobile device and the access control device only if the communication module receives the access credential from the mobile device.

13. The access control device of claim 12, wherein at least one of the access credentials and the advertising signal are transmitted to the communication module using a shortrange communication.

14. A method of operating an access control device comprising a detection sensor, a communication module, a processor, and a lock actuator, the method comprising:

detecting a status event with the detection sensor;

determining, by the processor, whether a distance between the access control device and a mobile device is greater than a threshold;

triggering a notification with the processor responsive to the distance being greater than the threshold; and maintaining the lock actuator in an unlocked position responsive to the distance being greater than the threshold.

15. The method of claim 14, wherein the status event comprises at least one of: a rotation of a handle, and an insertion or closure of a keybox.

16. The method of claim 14, further comprising maintaining a lock in an unlocked position when the distance is greater than the threshold.

17. The method of claim 14, wherein the processor determines the distance between the mobile device and the access control device based on a received signal strength of an advertising signal from the mobile device.

18. The method of claim 17, wherein the mobile device is configured to transmit the advertising signal only when a MEMS sensor detects movement of the mobile device.

19. The method of claim 14, wherein the processor determines the distance between the mobile device and the access control device to be greater than the threshold when an advertising signal is not received from the mobile device within a time period.

* * * * *